(12) United States Patent
Abraham et al.

(10) Patent No.: US 9,162,164 B2
(45) Date of Patent: Oct. 20, 2015

(54) JOINT SUPPORT SYSTEM FOR HYDROCYCLONE LINER

(75) Inventors: Nigel Hugh Abraham, Birmingham (GB); Michael John Kingsley, Bewdley (GB)

(73) Assignee: Cameron International Corporation, Houston, TX (US)

( * ) Notice: Subject to any disclaimer, the term of this patent is extended or adjusted under 35 U.S.C. 154(b) by 647 days.

(21) Appl. No.: 13/536,959

(22) Filed: Jun. 28, 2012

(65) Prior Publication Data
US 2014/0001117 A1  Jan. 2, 2014

(51) Int. Cl.
| | |
|---|---|
| B01D 29/11 | (2006.01) |
| B04C 5/13 | (2006.01) |
| B04C 5/14 | (2006.01) |
| B04C 5/28 | (2006.01) |
| B04C 5/081 | (2006.01) |
| B04C 5/085 | (2006.01) |

(52) U.S. Cl.
CPC .............. *B01D 29/11* (2013.01); *B01D 29/111* (2013.01); *B04C 5/081* (2013.01); *B04C 5/085* (2013.01); *B04C 5/13* (2013.01); *B04C 5/14* (2013.01); *B04C 5/28* (2013.01)

(58) Field of Classification Search
CPC ........ B01D 29/11; B01D 29/111; B04C 5/13; B04C 5/14; B04C 5/28; B04C 5/081; B04C 5/085
See application file for complete search history.

(56) References Cited

U.S. PATENT DOCUMENTS

| 5,133,861 A | 7/1992 | Grieve |
| 6,129,217 A | 10/2000 | Trickey et al. |

FOREIGN PATENT DOCUMENTS

| EP | 1502652 A1 | 2/2005 |
| FR | 1299917 A | 7/1962 |
| WO | 95/05899 A1 | 3/1995 |

OTHER PUBLICATIONS

PCT International Search Report & Written Opinion; PCT Application No. PCT/US2013/034431; dated Jul. 5, 2013.

*Primary Examiner* — David A Reifsnyder
(74) *Attorney, Agent, or Firm* — Fletcher Yoder P.C.

(57) ABSTRACT

A system includes a hydrocyclone liner. The hydrocyclone liner includes a head section having a fluid inlet and an overflow outlet. The hydrocyclone liner also includes a separation section having an underflow outlet and a first sidewall. A diameter of the separation section of an outer surface of the first sidewall is constant along a length of the outer surface of the first sidewall. The head section and the separation section are joined together via a bond at an interface between the head section and the separation section. The hydrocyclone liner includes a sleeve disposed about at least a portion of the head section, the separation section, and the interface. The sleeve is configured to hold the head section and the separation section together if the bond fails.

20 Claims, 3 Drawing Sheets

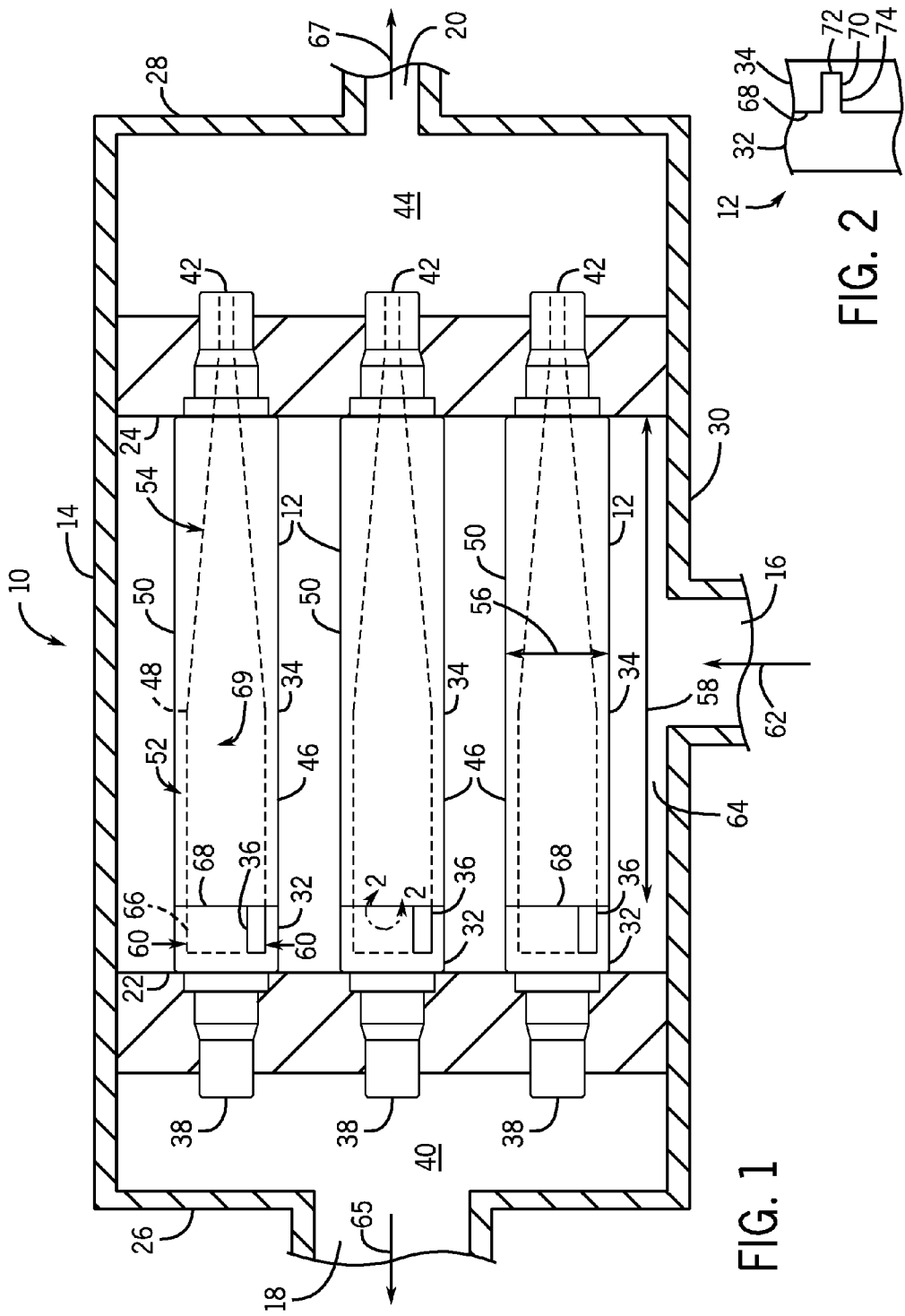

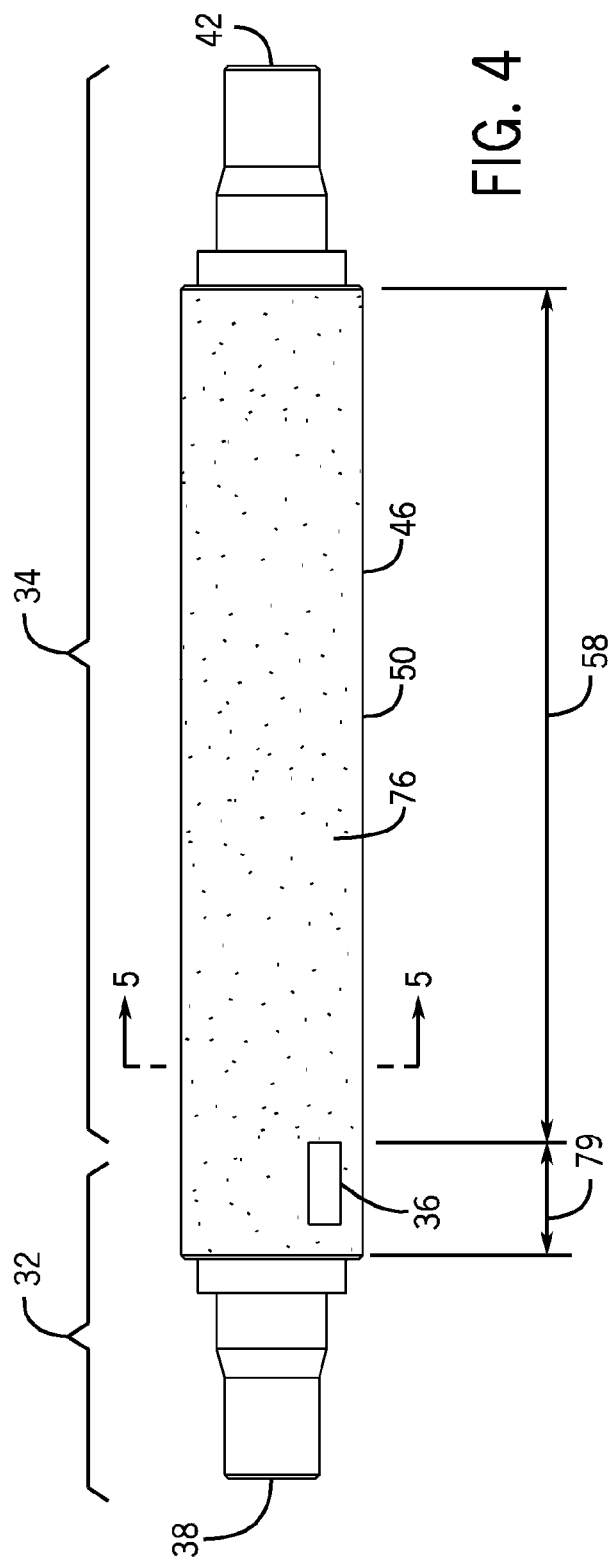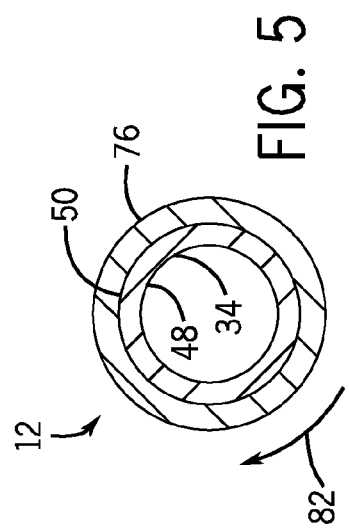

JOINT SUPPORT SYSTEM FOR HYDROCYCLONE LINER

FIELD OF THE INVENTION

This invention relates to hydrocyclone liners. More particularly, the present invention relates to a hydrocyclone liner employing a sleeve to support the joints between components of the hydrocyclone liner.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Desanding hydrocyclones are often used to remove solid particles (e.g., sand) from multi-phase fluid streams (e.g., including gaseous/aqueous/hydrocarbon phases). The desanding hydrocyclone may include multiple liners for removing the solid particles from the multi-phase fluid streams. For example, fluids are directed along an involute into the desanding hydrocyclone liners that causes the fluids to spin. The spinning motion generates strong centrifugal forces, which cause solids and liquids to separate. As a result, the heavier solids are forced outward toward a wall of each hydrocyclone liner and the lighter fluids migrate toward a center core, where the lighter fluids flow through an overflow and the heavier solids are directed to an underflow. Typically, the hydrocyclone liners are made of hard but brittle materials. The sections (e.g., head and separation sections) of the liners are bonded together and sometimes include joints at an interface between the sections. However, during maintenance or operation of the liners, the bonds and/or joints may fail (e.g., due to mishandling) resulting in damage to the liners.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is a partial side cross-sectional view of an exemplary hydrocyclone assembly for separation of solids from a multi-phase fluid mixture having multiple hydrocyclone liners;

FIG. 2 is cut-away view of an interface between a head section and a separation section of one of the hydrocyclone liners of FIG. 1, taken within line 2-2;

FIG. 4 is a side view of an exemplary embodiment of one of the hydrocyclone liners of FIG. 1 having a sleeve; and FIG. 5 is a cross-sectional view of the hydrocyclone liner of FIGS. 3 and 4 taken along line 5-5.

DETAILED DESCRIPTION OF SPECIFIC EMBODIMENTS

Figure 3:
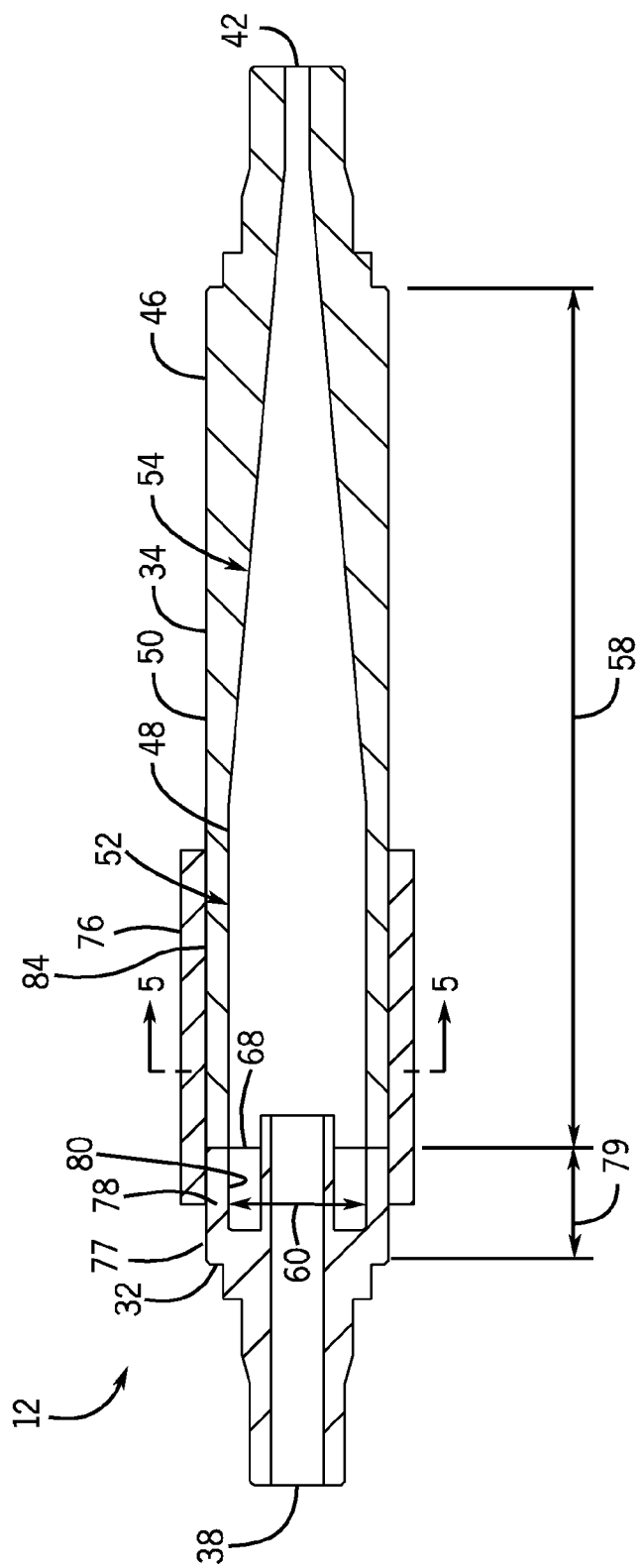
FIG. 3 is a side cross-sectional view of an exemplary embodiment of one of the hydrocyclone liners of FIG. 1 having a sleeve.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," "said," and the like, are intended to mean that there are one or more of the elements. The terms "comprising," "including," "having," and the like are intended to be inclusive and mean that there may be additional elements other than the listed elements. Moreover, the use of "top," "bottom," "above," "below," and variations of these terms is made for convenience, but does not require any particular orientation of the components.

As described in detail below, the disclosed embodiments include a hydrocyclone (e.g., solid/liquid hydrocyclone such as a desanding hydrocyclone). The hydrocyclone includes multiple hydrocyclone liners (e.g., desanding liners) having sleeves disposed about sections of the liners to hold these sections together. Each liner includes a head section having a fluid inlet and an overflow outlet. Also, each liner includes a separation section having an underflow outlet and a sidewall. A diameter of an outer surface of the sidewall is constant along a length of the separation section. In certain embodiments, a cylindrical diameter of an inner surface of a sidewall of the head section is less than approximately 25.4 centimeters (cm) (10 inches (in.)). For example, the cylindrical or inner diameter (e.g., inner diameter) of the inner surface of the sidewall of the head section may range from approximately 1.27 cm (0.5 in.) to 10.16 cm (4 in.). In some embodiments, the diameter of the outer surface of the sidewall may include a tapered profile. The head section and the separation section are joined together at an interface between the head section and separation section via a bond and/or one or more bonded joints (e.g., joggle joint). Each liner includes a sleeve disposed about at least a portion of a head section and a separation section and the interface. In certain embodiments, the sleeve is disposed about the entire length of the outer surface of the sidewall of the separation section. The sleeve holds the head section and the separation section together during maintenance or operation of hydrocyclone liner if the bond and/or at least one bonded joint fails. The sleeve may include a composite material having a reinforcing material distributed within a matrix material.

Turning now to the figures, an exemplary hydrocyclone or hydrocyclone assembly 10 (e.g., a solid/liquid hydrocyclone such as a desanding hydrocyclone) having a plurality of hydrocyclone liners 12 is illustrated in FIG. 1. The hydrocyclone assembly 10 may be used in a variety of applications in the drilling industry (e.g., petroleum industry), power plants, pulp and paper mills, metal working, mineral processing, irrigation, and other industries. The number of liners 12 within the assembly 10 may range from 1 to several hundred. As described in greater detail below, each hydrocyclone liner 12 may include a sleeve disposed about segments of the liners 12 to holds the segments together if the bonds and/or joints fail during maintenance or operation of the liners 12. In certain embodiments, each hydrocyclone liner 12 may be a solid/liquid hydrocyclone liner that separates solid particles from a multi-phase fluid stream. For example, each solid/liquid hydrocyclone 12 may be a desanding hydrocyclone that removes sand and other solid particles from the multi-phase fluid stream. In the presently illustrated embodiment, the hydrocyclone assembly 10 includes a vessel 14 (e.g., cylindrical or annular vessel) disposed about the plurality of liners 12. The vessel 14 includes a fluid inlet 16, an overflow or reject outlet 18, and an underflow outlet 20. Two support plates 22, 24 are disposed within the vessel 14 adjacent or proximate top wall 26 and bottom wall 28 having the overflow outlet 18 and underflow outlet 20, respectively. The location of the outlets 18, 20 on their respective vessel walls 26, 28 may vary. As depicted, the fluid inlet 16 is disposed on a sidewall 30 of the vessel 14 between the two support plates 22, 24. The plurality of liners 12 are clamped between the support plates 22, 24.

As depicted, each liner 12 includes a head section 32 and a separation section 34. These sections may be made of alumina ceramic, silicon carbide, silicon nitride, zirconia, stainless steel, and/or other materials. The head section 32 includes at least one fluid inlet 36 to enable entry of multi-phase fluids. In certain embodiments, the head section 32 may include more than one fluid inlet 36. The head section 32 also includes an overflow outlet 38 for the separated fluids or liquids to exit into an overflow cavity 40 of the vessel 14. The separation section 34 includes an underflow outlet 42 for the solid particles or slurry (e.g., sand) to exit into an underflow cavity 44 of the vessel 14. The separation section 34 also includes an outermost sidewall 46 (e.g., cylindrical or annular wall). The sidewall 46 includes an inner surface 48 and an outer surface 50. The inner surface 48 defines a cylindrical portion 52 (e.g., adjacent the fluid inlet 36) and a tapered portion 54 (e.g., adjacent the underflow outlet 42). As depicted, the outermost sidewall 46 includes a constant diameter 56 of the outer surface 50 along a length 58 of the sidewall 46. In some embodiments, the diameter 56 of the outer surface 50 of the sidewall 46 may include a tapered profile. The head section 32 includes a diameter 60 (e.g., cylindrical diameter or inner diameter) of an inner surface of an outermost sidewall (see FIG. 3). In certain embodiments, the cylindrical diameter 60 is approximately less than approximately 25.4 cm (10 in.). For example, the cylindrical diameter 60 may range from approximately 1.27 cm (0.5 inches) to 10.16 cm (4 in.). In certain embodiments, the cylindrical diameter 60 may be 1.27 cm (0.5 in.), 2.54 cm (1.0 in.), 5.08 cm (2.0 in.), 7.62 cm (3 in.), or 10.16 cm (4 in.), or any other diameter 60.

As depicted in FIG. 1, under high pressure, a multi-phase fluid stream, as indicated by arrow 62, enters a cavity 64 of the vessel 14 disposed between the plates 22, 24. High pressure, multi-phase fluid streams are directed tangentially into the fluid inlets 36 of the liners 12, which causes the fluid streams to spin along an involute 66 of the head section 32 of each liner 12. The spinning motion generates strong centrifugal forces, which induces the solids and liquid to separate. The centrifugal force generated in the liners 12 varies over the liner's length 58. In certain embodiments, the centrifugal force may reach 2000 g. The heavier solids are forced outward towards the inner surface 48, while the lighter fluids (e.g., liquid) migrate toward a center core 69 of the liner 12. The lighter fluids flow through the overflow outlet 38 of each liner 12 into the overflow cavity 40 and exit the vessel 14 via the vessel overflow outlet 18, as indicated by arrow 65, at a lower pressure relative to the pressure at the vessel inlet 16. The heavier solids (e.g., sand) are directed through the underflow outlet 42 of each liner 12 into the underflow cavity 44 and exit the vessel 14 via the vessel underflow outlet 20, as indicated by arrow 67, at a lower pressure relative to the pressure at the vessel inlet 16.

During operation and/or maintenance of the liners 12 a sleeve or shell (shown in FIGS. 3-5) may hold the head section 32 and the separation section 34 together. The head section 32 and the separation section 34 are joined or bonded together at an interface 68 between the sections 32, 34. For example, the sections 32, 34 may be bonded via epoxy adhesives, glass fusion, or in some other manner at the interface 68. The sleeve is disposed (e.g., circumferentially, see FIG. 5) about a portion of the head section 32, a portion of the separation section 34, and the interface 68. The sleeve is not disposed about the fluid inlets 36 of the liners 12. In certain embodiments, particular sections 32, 34 may include further sections or subsections that form additional interfaces. The sleeve may also be disposed about these additional interfaces. In some embodiments, the sleeve may include a composite material. The composite material may include a reinforcing material (e.g., fibers, particles, etc.) distributed in a matrix material (e.g., epoxy). Examples of reinforcing material that may be used include, but are not limited to, para-aramid fibers (e.g. poly-paraphenylene terephthalamide), other polymer fibers, metal fibers, ceramic fibers, carbon fibers, glass fibers, or combinations thereof. Examples of a matrix material include epoxy, metal powder, or ceramic powder. In certain embodiments, the sleeve may include an epoxy reinforced with carbon fibers and/or glass fibers. In some embodiments, the sleeve may include a polymeric material (e.g., rubber or any other natural or synthetic polymeric material). In certain embodiments, the sleeve may be disposed about the entire length 58 of the outer surface 50 of the outermost sidewall 46 of the separation section 34. The sleeve holds the head section 32 and the separation section 34 of each liner 12 together during maintenance or operation of the liner 12 if the bond fails.

In certain embodiments, as depicted in FIG. 2, the head section 32 and the separation section 34 may include one or more joints 70 (e.g., bonded joints) for joining the sections 32, 34. For example, one or more joints 70 may include a joggle joint. The joggle joint 70 may increase the contact area (e.g., along interface 68) between the faces of the sections 32, 34 to be bonded as well as ensure alignment of the sections 32, 34. As depicted, the head section 32 includes a projection 72 that fits within a recess 74 of the separation section 34 to form the joint 70. In other embodiments, the separation section 34 includes the projection 72 and the head section includes the recess 74. The shape of the projection 72 and the corresponding shape of the recess 74 may vary. As depicted, the projection 72 and recess 74 are rectilinear. The sleeve holds the head section 32 and the separation section 34 of each liner 12 together during maintenance or operation of the liner 12 if the bond and/or joints 70 fail.

FIG. 3 illustrates a side cross-sectional view of one of the hydrocyclone liners 12 from FIG. 1 having a sleeve 76. The liner 12 is as described above. The head section 32 and the separation section 34 are joined or bonded together at the interface 68 between the sections 32, 34 via a bond and/or at least one bonded joint (e.g., joggle joint). For example, the sections 32, 34 may be bonded via epoxy adhesives, glass fusion, or in some other manner at the interface 68. In certain embodiments, the head section 32 and the separation sections 34 are joined together without the use of additional fasteners (e.g., flanges). The sleeve 76 (e.g., annular sleeve) is disposed (e.g., circumferentially, see FIG. 5) about a portion of the head section 32, a portion of the separation section 34, and the interface 68. In particular, the head section 32 and separation section 34 form an interface 84 with the sleeve 76. In certain embodiments, the interface 84 may include an adhesive, diffusion bond, interference fit, and/or threaded interface. In certain embodiments, the sleeve 76 is preformed and is bonded (e.g., via epoxy adhesive) to the liner 12. The preformed sleeve 76 enables the retrofitting of the sleeve 76 onto the liner 12. In other embodiments, the sleeve 76 is applied to the liner 12 and shrunk fitted (e.g., via curing process) on to the liner 12.

As depicted, the sleeve 76 is depicted about only a portion of the head section 32. In particular, the sleeve 76 is disposed about an outer surface 77 of an outermost sidewall 78 (e.g. cylindrical or annular wall) of the head section 32. In certain embodiments, the sleeve 76 disposed about the outer surface 77 of the sidewall 78 may extend approximately 10 to 100 percent, 10 to 30 percent, 30 to 70 percent, or 70 to 100 percent along a length 79 of the sidewall 78. For example, in certain embodiments the sleeve 76 may extend approximately 10, 20, 30, 40, 50, 60, 70, 80, 90, or 100 percent (see FIG. 4) along the length 79 of the outer surface 78 of the outermost sidewall 78 of the head section 32.

The head section 32 includes the diameter 60 (e.g., cylindrical diameter or inner diameter) of an inner surface 80 of the sidewall 78. In certain embodiments, the cylindrical diameter 60 is approximately less than approximately 25.4 cm (10 in.). For example, the cylindrical diameter 60 may range from approximately 1.27 cm (0.5 inches) to 10.16 cm (4 in.). In certain embodiments, the cylindrical diameter 60 may be 1.27 cm (0.5 in.), 2.54 cm (1.0 in.), 5.08 cm (2.0 in.), 7.62 cm (3 in.), or 10.16 cm (4 in.), or any other diameter 60.

As depicted, the sleeve 76 is disposed about only a portion of the outer surface 50 of the outermost sidewall 46 of the separation section 34. In certain embodiments, the sleeve 76 disposed about the outer surface 50 of the outermost sidewall 46 of the separation section 34 may extend approximately 10 to 100 percent, 10 to 30 percent, 30 to 70 percent, or 70 to 100 percent along the length 58 of the outermost sidewall 46 of the separation section 34. For example, in certain embodiments the sleeve 76 may extend approximately 10, 20, 30, 40, 50, 60, 70, 80, 90, or 100 percent (see FIG. 4) along the length 58 of the outer surface 50 of the outermost sidewall 46 of the separation section 34. The sleeve 76 is not disposed about the fluid inlet 36 of the liner 12 (see FIG. 4).

In certain embodiments, particular sections 32, 34 may include further sections that form additional interfaces. The sleeve 76 may also be disposed about these additional interfaces. The sleeve 76 may include a composite material. The composite material may include a reinforcing material (e.g., fibers, particles, etc.) distributed in a matrix material (e.g., epoxy). Examples of reinforcing material that may be used include, but are not limited to, para-aramid fibers (e.g. polyparaphenylene terephthalamide), other polymer fibers, metal fibers, ceramic fibers, carbon fibers, glass fibers, or combinations thereof. Examples of a matrix material include epoxy, metal powder, or ceramic powder. In certain embodiments, the sleeve 76 may include an epoxy reinforced with carbon fibers and/or glass fibers. In some embodiments, the sleeve 76 may include a polymeric material (e.g., rubber or any other natural or synthetic polymeric material). The sleeve 76 holds the head section 32 and the separation section 34 of the liner 12 together during maintenance or operation of the liner 12 if the bond and/or joints fail.

FIG. 4 illustrates a side view of one of the hydrocyclone liners 12 from FIG. 1 having the sleeve 76. The liner 12 is as described above. As depicted the sleeve 76 is disposed about the entire length 58 of the outer surface 50 of the sidewall 46 of the separation section 34. Also, the sleeve 76 is disposed about the entire length 79 of the outer surface 77 of the sidewall 78 of the head section 32. As depicted, the sleeve 76 disposed about the portion of the head section 32 does not cover the fluid inlet 36.

FIG. 5 illustrates a cross-sectional view of the liner 12 of FIGS. 3 and 4 along line 5-5. The liner 12 is as described above. As illustrated, the sleeve 76 (e.g., annular sleeve) is circumferentially 82 disposed about the outer surface 50 of a portion of the sidewall 48 of the separation section 34. Similarly, the sleeve 76 is circumferentially 82 disposed about the outer surface 77 of a portion of the sidewall 78 of the head section 32 and the interface 68.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
    a hydrocyclone liner, comprising:
        a head section having a fluid inlet and an overflow outlet;
        a separation section having an underflow outlet and a first sidewall, wherein a diameter of the separation section of an outer surface of the first sidewall is constant along a length of the outer surface of the first sidewall, and the head section and the separation section are joined together via a bonded joint at an interface between the head section and the separation section; and
        a sleeve disposed about at least a portion of the head section, the separation section, and the interface, wherein the sleeve is configured to hold the head section and the separation section together if the bonded joint fails.

2. The system of claim 1, wherein the hydrocyclone liner comprises a solid/liquid hydrocyclone liner.

3. The system of claim 2, wherein the solid/liquid hydrocyclone liner comprises a desanding hydrocyclone liner.

4. The system of claim 1, wherein the head section comprises a second sidewall having an inner surface, and an inner diameter of the inner surface of the second sidewall of the head section is less than approximately 25.4 cm.

5. The system of claim 4, wherein the inner diameter of the inner surface of the second sidewall of the head section is between approximately 1.27 cm and 10.16 cm.

6. The system of claim 1, wherein the sleeve comprises a polymeric material or a composite material having a reinforcing material distributed within a matrix material.

7. The system of claim 1, wherein the sleeve is disposed about an entirety of the length of the outer surface of the first sidewall of the separation section.

8. The system of claim 1, comprising a hydrocyclone having the hydrocyclone liner.

9. A system, comprising:
    a solid/liquid hydrocyclone, comprising:
        a plurality of hydrocyclone liners, wherein each hydrocyclone liner comprises:
            a head section having a fluid inlet and an overflow outlet, wherein the fluid inlet is formed in a first sidewall of the head section and configured to enable a tangential flow of a fluid into the hydrocyclone liner;

a separation section having an underflow outlet and a second sidewall, wherein a diameter of the separation section of an outer surface of the second sidewall is constant along a length of the outer surface of the second sidewall, and the head section and the separation section are joined together via a bond at an interface between the head section and the separation section; and a sleeve disposed about at least a portion of the head section, the separation section, and the interface, wherein the sleeve is configured to hold the head section and the separation section together if the bond fails.

10. The system of claim 9, wherein the solid/liquid hydrocyclone comprises a desanding hydrocyclone.

11. The system of claim 9, wherein the first sidewall has an inner surface, and an inner diameter of the inner surface of the first sidewall of the head section of each hydrocyclone liner of the plurality of hydrocyclone liners is less than approximately 25.4 cm.

12. The system of claim 11, wherein the inner diameter of the inner surface of the first sidewall of the head section of each hydrocyclone liner of the plurality of hydrocyclone liners is between approximately 1.27 cm and 10.16 cm.

13. The system of claim 9, wherein the sleeve comprises a polymeric material or a composite material having a reinforcing material distributed within a matrix material.

14. The system of claim 9, wherein the sleeve is disposed about an entirety of the length of the outer surface of the second sidewall of the separation section of each hydrocyclone liner of the plurality of hydrocyclone liners.

15. The system of claim 9, wherein the head section and the separation section of each hydrocyclone liner of the plurality of hydrocyclone liners are joined together via at least one bonded joint at the interface between the head section and the separation section, and the sleeve is configured to hold the head section and the separation section together if the at least one bonded joint fails.

16. The system of claim 9, wherein the sleeve is coupled to the portion of the head section and the separation section via at least one of an adhesive, a diffusion bond, and an interference fit.

17. A method of manufacturing a solid/liquid hydrocyclone liner, comprising:

bonding together a head section and a separation section of the solid/liquid hydrocyclone liner at an interface between the head section and the separation section, wherein the head section has a fluid inlet and an overflow outlet, the fluid inlet is formed in a first sidewall and configured to enable a tangential flow of a fluid into the hydrocyclone liner, the separation section has an underflow outlet and a second sidewall, and a diameter of the separation section of an outer surface of the second sidewall is constant along a length of the outer surface of the second sidewall; and disposing a sleeve about at least a portion of the head section, the separation section, and the interface, wherein the sleeve is configured to hold the head section and the separation section together if the bond fails.

18. The method of claim 17, wherein disposing the sleeve about at least the portion of the head section, the separation section, and the interface comprises bonding a preformed sleeve on the head section, the separation section, and the interface.

19. The method of claim 17, wherein disposing the sleeve about at least the portion of the head section, the separation section, and the interface comprises shrink fitting the sleeve on the head section, the separation section, and the interface.

20. The method of claim 17, wherein the hydrocyclone liner comprises a desanding hydrocyclone liner.

* * * * *